United States Patent [19]

Ishikura

[11] Patent Number: 5,239,684
[45] Date of Patent: Aug. 24, 1993

[54] RADIO COMMUNICATION APPARATUS HAVING A FUNCTION FOR DISPLAYING RECEPTION FIELD STRENGTH AND METHOD OF CONTROLLING THE APPARATUS

[75] Inventor: Akira Ishikura, Tokyo, Japan
[73] Assignee: Kabushiki Kaisha Toshiba, Kawasaki, Japan
[21] Appl. No.: 553,453
[22] Filed: Jul. 17, 1990
[30] Foreign Application Priority Data Jul. 18, 1989 [JP] Japan .................................. 1-185766
Nov. 22, 1989 [JP] Japan .................................. 1-305024

[51] Int. Cl.$^5$ .................................................. H04B 17/00
[52] U.S. Cl. ................................ 455/67.7; 455/226.2; 455/226.4
[58] Field of Search ..................... 455/67.1, 67.7, 140, 455/152.1, 157.2, 161.3, 226.2, 226.4, 345, 346

[56] References Cited

U.S. PATENT DOCUMENTS

| | | | |
|---|---|---|---|
| 3,908,165 | 9/1975 | Cauldwell | 455/226.2 |
| 4,673,861 | 6/1987 | Dubovsky et al. | 455/346 |
| 4,939,788 | 7/1990 | Hasegawa | 455/250.1 |
| 4,962,523 | 10/1990 | Tanaka | 455/346 |
| 5,091,919 | 2/1992 | Kuisma | 455/126 |

FOREIGN PATENT DOCUMENTS 8706748 11/1987 World Int. Prop. O. ......... 455/67.7

Primary Examiner—Reinhard J. Eisenzopf
Assistant Examiner—Edward Urban
Attorney, Agent, or Firm—Finnegan, Henderson, Farabow, Garrett & Dunner

[57] ABSTRACT

A radio communication apparatus such as an automobile telephoné apparatus capable of accurately displaying a reception field strength. Also disclosed is a method of setting a threshold value for displaying a reception field strength of the radio communication apparatus. A storage device for storing correction data for the reception field strength corresponding to a mode of usage of the radio communication apparatus is provided. At the time when information on the reception field strength is supplied to a user, the reception field strength is corrected on the basis of correction data stored in the storage device to effect the notification. A radio signal of a predetermined strength corresponding to a reference value is generated from the outside, the radio signal generated is received, the reception field strength of the radio signal received is detected, and the value of the reception field strength detected is stored in a storage device as data on the threshold value.

10 Claims, 8 Drawing Sheets

| LEVEL | RECEPTION FIELD STRENGTH | THRESHOLD VALUE | CORRECTION THRESHOLD VALUE |
|---|---|---|---|
| 1 | -70dBm | 80 ~ | 85 ~ |
| 2 | -80dBm ~ -70dBm | 70 ~ 80 | 74 ~ 85 |
| 3 | -90dBm ~ -80dBm | 60 ~ 70 | 66 ~ 74 |
| 4 | -100dBm ~ -70dBm | 50 ~ 60 | 54 ~ 66 |
| 5 | ~ -100dBm | ~ 50 | ~ 54 |

FIG. 7

RADIO COMMUNICATION APPARATUS HAVING A FUNCTION FOR DISPLAYING RECEPTION FIELD STRENGTH AND METHOD OF CONTROLLING THE APPARATUS

BACKGROUND OF THE INVENTION

1. Field of the Invention

The present invention relates to a ratio communication apparatus such as an automobile telephone apparatus or the like and a method of controlling the apparatus, and more particularly to an apparatus for radio communication which is capable of accurately displaying the reception field strength and a method of controlling the apparatus.

2. Description of the Related Art

Automobile telephone apparatus are provided with a function for detecting the reception field strength for controlling a transmission output and determining whether or not the apparatus is in a usable area. Since it is helpful on the part of the users to know the reception field strength, the reception field strength is in many cases displayed on a display unit constituted by a liquid crystal display or the like.

In recent years, radio telephone apparatus of a type in which they are used in common as a portable telephone apparatus and a vehicle-mounted telephone apparatus have been developed and put on the market.

The radio telephone apparatus of this common use type comprises a main body mounted on the vehicle and a portable radio device which is used in a situation in which it is installed on the vehicle-mounted main body and i used by being removed from the main body as an independent radio telephone apparatus.

A control unit, a display unit and a key unit are provided on the portable radio device, and these units are used in common in either situation.

With such a common use-type radio telephone apparatus, however, depending on the situations where the portable radio device is used by being installed on the vehicle-mounted main body and where it is used independently, transmission routes leading from an antenna to various units of the apparatus differ. For this reason, when displaying the reception field strength on the display unit, there has been a problem in that, depending on the situations where the portable radio device is used by being installed on the vehicle-mounted main body and where it is used independently, the display value differs even though the reception field strength is actually the same.

In addition, when displaying the reception field strength on the liquid crystal display or the like, the display is usually effected on a digital basis. In the digital-basis display, threshold values for determining a plurality of stages set in correspondence with the reception field strength are stored in advance, and the stage of the reception field strength is determined on the basis of a comparison with the stored threshold values (reference values), and that stage is displayed on the liquid crystal display.

Conventionally, however, the aforementioned threshold values are fixedly stored in a ROM. Since the display of the reception field strength is dependent upon variations in the reception characteristics among apparatus, it is impossible to display the reception field strength accurately.

SUMMARY OF THE INVENTION

Accordingly, an object of the present invention is to provide an apparatus and a method for radio communication capable of displaying the reception field strength accurately, thereby overcoming the above-described problems of the conventional art.

To this end, in accordance with one aspect of the present invention, there is provided a radio communication apparatus adapted to measure a reception field strength of a radio signal received through a radio communication channel and supply information on the reception field strength detected to a user, the radio communication apparatus comprising: a storage device for storing correction data for the reception field strength corresponding to a mode of usage of the apparatus, wherein information on the reception field strength is accurately supplied to the user because the reception field strength is corrected on the basis of correction data stored in the storage device.

In accordance with the present invention, correction of the reception field strength is effected in correspondence with a mode of usage of the radio communication apparatus, and the reception field strength thus corrected is displayed, so that it is possible to display the reception field strength always accurately.

In addition, in accordance with another aspect of the present invention, there is provided a radio communication apparatus comprising: a receiving device for receiving a radio signal received through a radio communication channel; a detecting device for detecting a reception field strength of the radio signal received by the receiving device; a storage device for storing threshold values for determining a plurality of stages set in correspondence with the reception field strength; a comparator for determining the stage of the reception field strength detected by the detecting device, through a comparison with the threshold value stored in the storage device; and a writing device for writing in the storage device a value a based on the reception field strength detected by the detecting device.

In addition, the radio communication apparatus having the above-described arrangement is capable of receiving reference signals with predetermined reception field strengths through the receiving device and of rewriting threshold values stored in the storage device based on the reception field strengths of the reference signals detected by the detecting device.

In accordance with still another aspect of the present invention, there is provided a radio communication apparatus comprising: a receiving device for receiving a radio signal received through a radio communication channel; a detecting device for detecting a reception field strength of the radio signal received by the receiving device; a storage device for storing threshold values for determining a plurality of stages set in correspondence with the reception field strength; a comparator for determining the stage of the reception field strength detected by the detecting device, through a comparison with the threshold value stored in the storage device; a display device for displaying the stage of the reception field strength determined by the comparator; an input device for inputting a threshold value in the storage device; and a writing device for writing in the storage device a threshold value inputting by the input device.

In accordance with a further aspect of the invention, there is provided a method of setting a threshold value for displaying a reception field strength of a reception signal received by a radio communication apparatus so as to determine under which stage a reception field strength of the reception signal falls, by using at least one threshold value, in order to display in stages the reception field strength of a signal received via a radio communication channel, comprising the steps of:

a) generating a radio signal of a predetermined strength corresponding to a reference value from the outside of the radio communication apparatus;

b) receiving the radio signal generated;

c) detecting a reception field strength of the radio signal received; and d) storing a value of the detected reception field strength as data on the threshold value.

In accordance with the present invention, since it is possible to rewrite the threshold value from the outside, it is possible to effect the display of the reception field strength accurately.

In addition, even in cases where there are variations in the reception characteristics depending on apparatus, a threshold value for displaying the reception field strength is set in such a manner as to correct the variations, so that the reception field strength can be displayed accurately.

BRIEF DESCRIPTION OF THE DRAWINGS

FIG. 5 is a diagram illustrating an example of display of a field strength signal on a liquid crystal display shown in FIG. 4;

FIG. 6 is a diagram illustrating the details of a key unit shown in FIG. 1;

FIG. 7 is a diagram illustrating the operation of the embodiment;

DESCRIPTION OF THE PREFERRED EMBODIMENT

Referring now to the accompying drawings, a detailed description will be given of the embodiment of the present invention.

Figure 1:
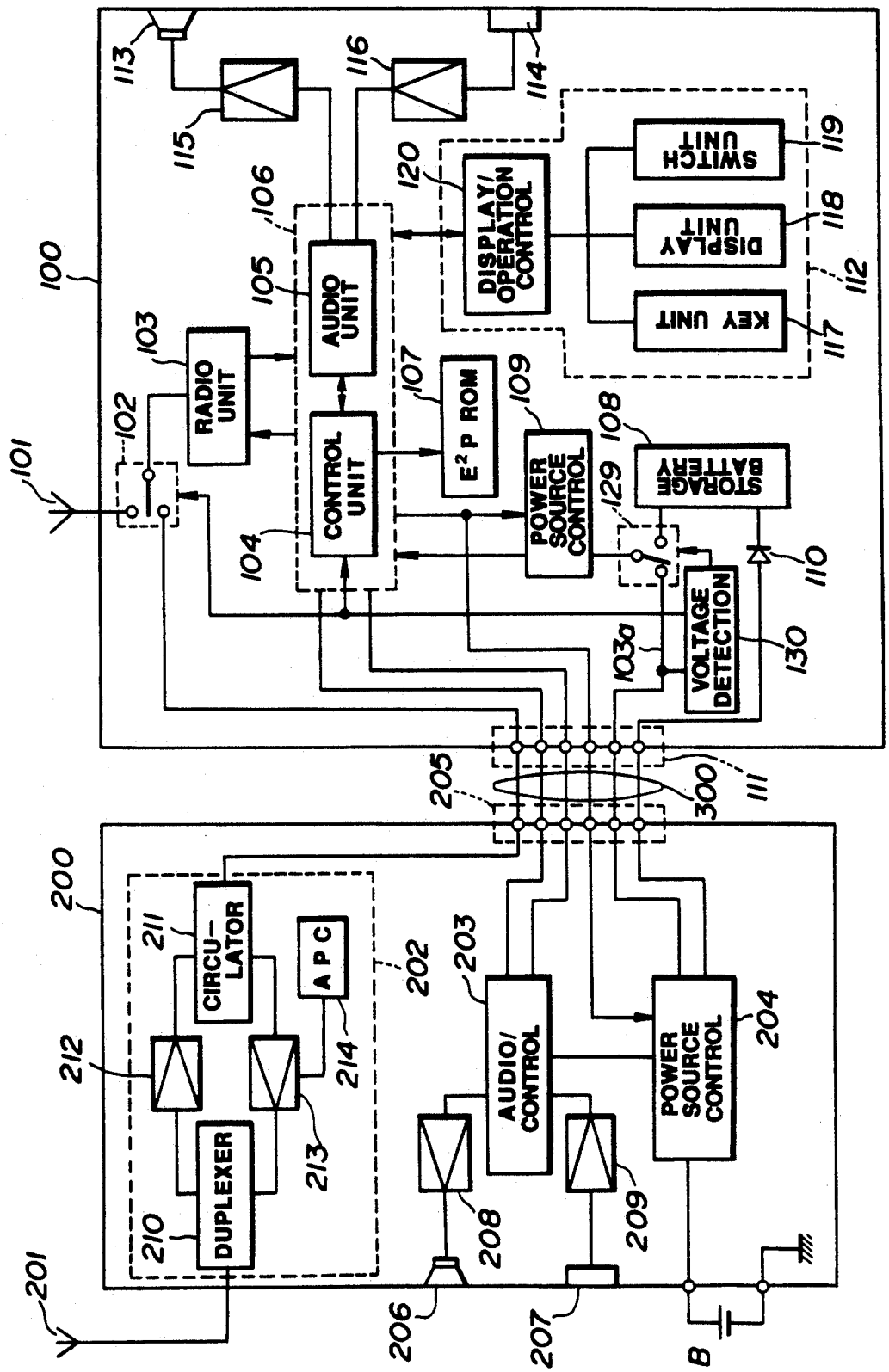
FIG. 1 is a block diagram illustrating a radio telephone apparatus in accordance with an embodiment of the present invention.

FIG. 1 is a block diagram illustrating an embodiment of a radio telephone apparatus of a type in which it is used in common as a portable telephone apparatus and a vehicle-mounted telephone apparatus to which the present invention is applied.

In FIG. 1, the radio telephone apparatus comprises a portable radio device 100 and a vehicle-mounted main body (adapter unit) 200.

The portable radio device 100 forms a radio communication channel together with an antenna 101, a changeover switch 102, and a base station (not shown). The portable radio device 100 includes the following major components: a radio unit 103 for receiving and transmitting signals; an audio/control section 106 constituted by a control unit 104 and an audio unit 105 and adapted to effect general control of the overall apparatus; an E$^2$PROM 107 in which threshold values for determining the field strength, which will be described later, are registered, the threshold values for determining the field strength being predetermined data required for a data correction which is made when a display unit 118 displays a system ID No. corresponding to a zone under which the apparatus has been registered, the telephone number of this apparatus, and the reception field strength, a power source control unit 109 for controlling power supply in the portable radio device 100; a storage battery 108 serving as a power source when the portable radio device is carried around; a connector unit 111 connected to the vehicle-mounted main body 200; an operator/display section 112; a microphone 114 and a speaker 113 for inputting and outputting audible sounds; an output amplifier 115; and an input amplifier 116.

The operation/display section 112 is constituted by a key unit 117 for predetermined keying; a switch unit 119 for carrying out various switching operations; an operation/display control unit 120 for controlling the key unit 117, the display unit 118, and the switch unit 119; and a voltage detection circuit 130 for detecting a voltage level of a power supply route 130a.

The output amplifier 115 amplifies an audible sound signal (voice signal) delivered from the audio unit 105 of the portable radio device 100, and the amplifier signal is outputted from the loudspeaker 113.

The input amplifier 116 amplifies an audible sound signal (voice signal) inputted from the microphone 114. The amplifies signal is inputted to the audio unit 105 of the portable radio device 100.

The operation/display control unit 120 is adapted to effect general control of the operation/display section 112 on the basis of a control signal delivered from the audio/control section 106, and send to the audio/control section 106 a control signal and the like inputted from the key unit 117.

Figure 4:
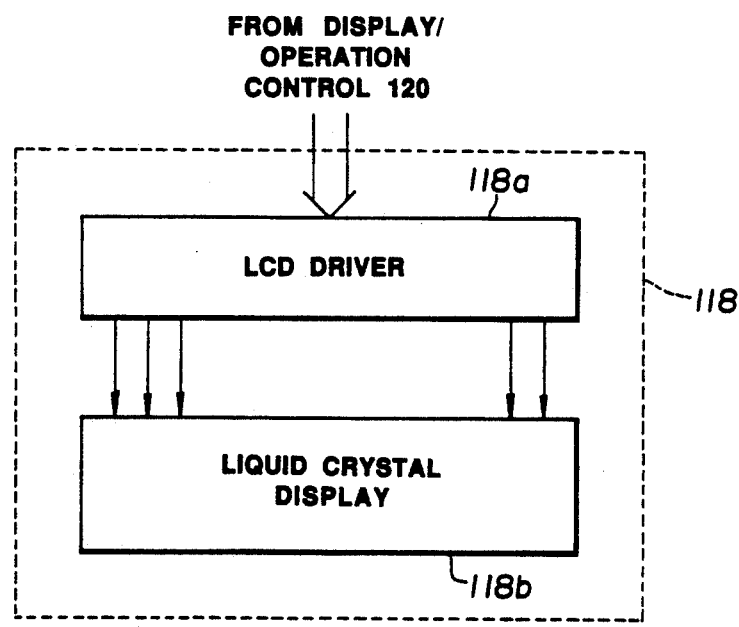
FIG. 4 is a block diagram illustrating the details of a display unit shown in FIG. 1.

As shown in FIG. 4, the display unit 118 is constituted by an LCD driver 118a and a liquid crystal display 118b, and the LCD driver 118a drives the liquid crystal display 118b on the basis of controls by the display/operation control unit 120 so as to effect predetermined display.

The liquid crystal display 118b is constituted by a numeric display portion and a portion for displaying various functions, and displays a field strength signal, as shown in FIG. 5. In this example, the field strength signal is displayed in five stages, and the shadowed portions indicate segments being lit, which means that the greater the number of these segments being lit, the stronger the field strength signal. That is , all the four segments are lit at level 1 which is the highest level, three segments are lit at level 2 which is the second highest level, and all the segments are off at level 5 which is the lowest level.

As shown in FIG. 6, the key unit 117 is constituted by a keypad including keys for such as numeric keys "0" to "9", "*", "#", "SN", "STO", "END", "RCL", "FCN", "CLR", "EMR", "MUTE", and "TONE".

The pressing of the keyboard is recognized by the operation/display control unit 120.

The switch unit 119 is provided with a hook switch and an ON/OFF switch (neither is shown), and a on-hook state and and off-hook state of the portable radio device 100 is detected by the hook switch. The hook switch may be provided on the vehicle-mounted main body 200 as well. The ON/OFF switch is adapted to switch on and off the overall radio telephone apparatus, and the changeover signal is sent from the operation/display control unit 120 to the audio/control section 106.

The vehicle-mounted main body 200 includes the following major components: an antenna 201 installed on the vehicle; a booster 202 for boosting signals transmitted and received by the antenna 201 to fixed electric power; an audio/control unit 203 for effecting general control of the overall vehicle-mounted main body 200 on the basis of a command and the like from the audio/control unit of the portable radio device 100; a power source control unit 204 for supplying power from a battery B mounted in the vehicle to various parts; a connector unit 205 connected to the connector unit 111 of the portable radio device 100 via a coaxial cable 300; a loudspeaker 206 and a microphone for inputting and outputting audible sounds; and output amplifier 208; and an input amplifier 209.

The booster 202 is constituted by an antenna common-use device 210, a circulator 211, a reception amplifier 212, a transmission amplifier 213, and an automatic power control (APC) circuit 214 for controlling the transmission level of the transmission amplifier 213.

A description will now be given of the details of the portable radio device 100.

Figure 2:
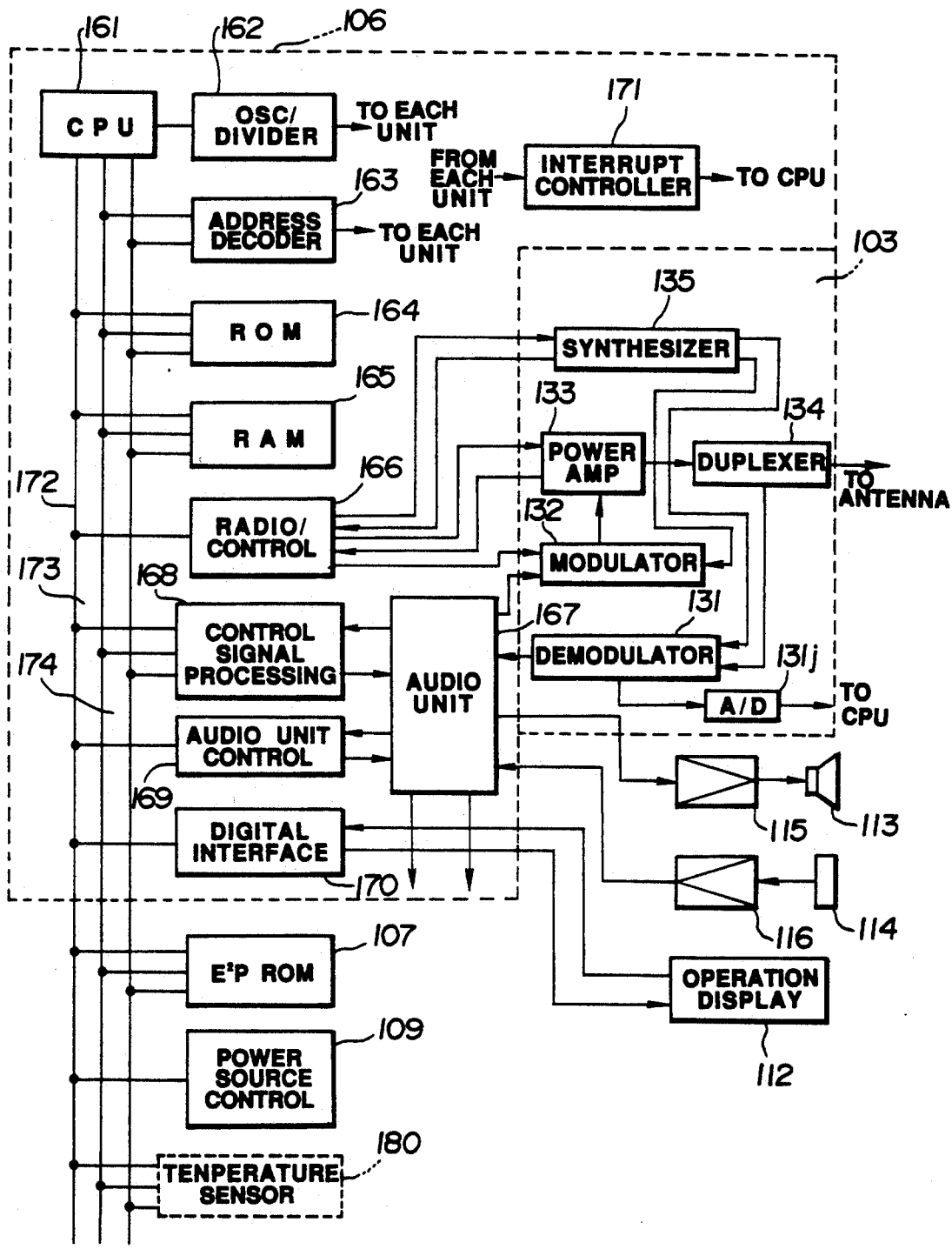
FIG. 2 is a block diagram illustrating the details of a portable radio device shown in FIG. 1.

FIG. 2 is a block diagram illustrating in detail a configuration of the above-described portable radio device 100.

In FIG. 2, the radio unit 103 is constituted by a demodulator 131, a modulator 132, a power amplifier 133, a duplexer 134, and a synthesizer 135.

The demodulator 131 demodulates reception signals from a base station that are inputted via the antenna 101, the changeover switch 102, and the duplexer 134 on the portable radio device 100 side, or via the antenna 201, the booster 202, the changeover switch 102, and the duplexer 134 on the vehicle-mounted main body 200 side. Included among these signals are control signals and audible sound signals.

Figure 3:
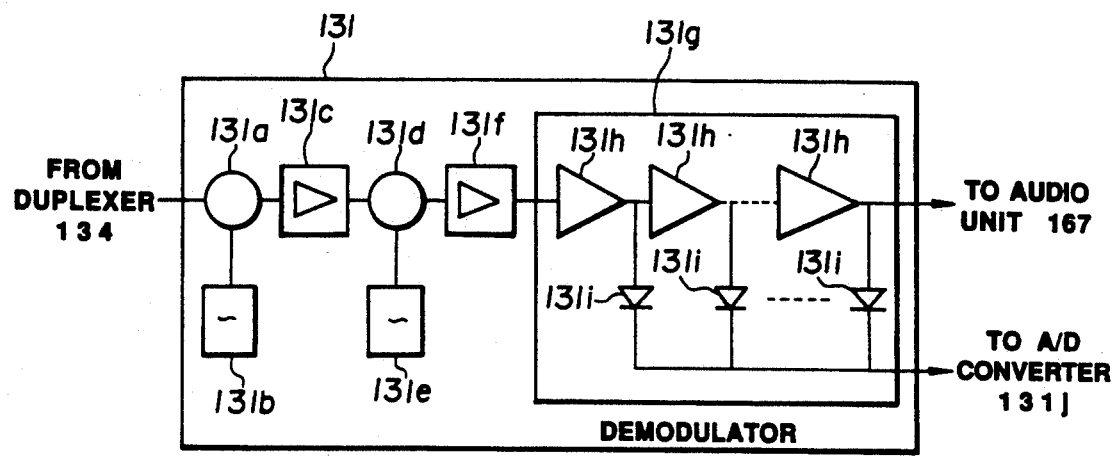
FIG. 3 is a block diagram illustrating the details of a demodulator shown in FIG. 2.

FIG. 3 is a diagram illustrating an example of a configuration of the demodulator 131. In FIG. 3, a reception signal sent from the duplexer 134 is mixed by a mixer 131a with a first local oscillation signal oscillated by a first local oscillator 131b so as to be frequency converted into a first intermediate frequency, and is then amplified by a first intermediate frequency amplifier 131c. Subsequently, this signal is than mixed by a mixer 131d with a second local oscillation signal oscillated by a second local oscillator, and is then amplified by a second intermediate frequency amplifier 131f before the signal is sent to an intermediate frequency circuit unit 131g.

The intermediate frequency circuit unit 131g has a plurality of linear amplifiers 131h, . . . , and the signal inputted as described above is amplified by these linear amplifiers 131h before it is sent to an audio 167. In addition, in the intermediate frequency circuit unit 131g, the outputs of the linear amplifiers 131h are detected by a diode 131i, and the detection signal is supplied to an A/D converter 131j.

The A/D converter 131j converts the detection signal which is an analog signal into a digital signal, and this digital signal is sent to a CPU 161.

The signal thus inputted to the CPU 161 via the diode 131i and the A/D converter 131j is a reception-field-strength signal corresponding to the reception field strength. On the basis of this reception-field-strength signal, the CPU 161 controls a transmission output and makes a determination as to such as whether or not the apparatus is in a service area.

The demodulator 132 demodulates an audible sound signal, a control signal, and so on that are outputted from the audio/control section 106 so as to provide a transmission signal. The power amplifier 133 amplifies the transmission signal outputted from the demodulator 132. The duplexer 134 sends to the demodulator 131 the reception signal inputted via the antenna 101 or 201, and sends to the antenna 101 or 201 the transmission inputted via the demodulator 132 and the power amplifier 133. The synthesizer 135 is a local oscillator for channel selection, and designates a frequency to be demodulated by the demodulator 131 and a frequency to be modulated by the modulator 132.

The audio/control section 106 is constituted by the CPU 161, an oscillator/divider 162, an address decoder 163, a ROM 164, a RAM 165, a radio unit control unit 166, an audio unit 167, a control signal processing unit 168, an audio unit control unit 169, a digital interface 170, an interrupt controller 171. It should be noted that in the drawing reference numeral denotes the aforementioned E2PROM; 109, the power source control unit; 172, a, for instance, 8-bit data bus; 173, an address bus; and 174, a control bus.

The CPU 161 effects general control of the overall audio/control section 106. For instance, as described above, on the basis of the reception-field-strength signal inputted via the diode 131i and the A/D converter 131j, the CPU 161 controls a transmission output and makes a determination as to such as whether or not the apparatus is in a service area. Or the CPU 161 causes the display unit 118 to display the reception field strength. The oscillator/divider 162 supplies clock pulses to the CPU 161, and divides and supplies then to respective parts as a timing signal. The address decoder 163 outputs a predetermined operation signal to each part in response to a command signal from the CPU 161. The ROM 164 stores various types of programs necessary for the operation of the CPU 161. The RAM 165 stores various data at the time of processing by the CPU 161. The radio unit control unit 166 controls the radio unit 103 on the basis of a command from the CPU 161. For example, the radio unit control unit 166 designates a frequency to be specified by the synthesizer 135, an amplification factor to be assumed by the power amplifier 133, and a modulation factor to be assumed by the modulator 132, and so on. At the same time, as a measure for preventing a malfunctioning, the radio unit control unit 166 receives as its inputs such as an out-of-step signal outputted from the synthesizer 135 and an output detection signal outputted from the power amplifier 133, and delivers the same to the CPU 161.

The audio unit 167 sends a control signal among the reception signals demodulated by the demodulator 131 to the control signal processing unit 168, and sends an audible sound signal among the reception signals to the loudspeaker 113 via the output amplifier 115. In addition, the audio unit 167 sends to the modulator 132 the control signal outputted from the control signal processing unit 168 and the audible sound signal outputted from the microphone 114 via the input amplifier 116. It should be noted that the audio unit 167 has the functions of forming the waveform of the control signal to be sent to the control signal processing unit 168 and of filtering the control signal to be sent to the modulator 132.

The control signal processing unit 168 undergoes bit synchronization and frame synchronization with respect to the control signal outputted from the audio unit 167, and fetches as a parallel signal the control data from a base station included in the control signal which is a serial signal. Meanwhile, the control signal processing unit 168 sends control data, which is a parallel signal to be sent to the base station, to the audio unit 167 as the control signal which is a serial signal.

The audio unit control unit 169 effects various types of control for the audio unit 167. For example, the audio unit control unit 169 effect switching control regarding to which of the control signal processing unit 168 and the output amplifier 115 the reception signal is to be sent from the audio unit 167, and switching control regarding which of the transmission signals outputted from the input amplifier 116 is to be fetched by the audio unit 176

The digital interface 170 establishes an interface between the audio/control section 106 and the operation/display section 112. Upon receipt of an interrupt command from each part, the interrupt controller 171 generates an interrupt to the CPU 161.

The voltage detection circuit 130 detects the voltage level of the power supply route 130a, and if the voltage of the power supply route 130a is not less than a predetermined voltage, the voltage detection circuit 130 drives the power changeover switch 108 in such a manner that the power supply route 130a is connected to the power source control unit 109, and drives the changeover switch 102 in such a manner that the radio unit 103 is connected to the booster 202. Accordingly, when the portable radio device 100 is not connected to the vehicle-mounted main body 200, power for the power source control unit 109 is supplied by the storage battery 110, and the radio unit 103 is connected to the antenna 101.

Next, a description will be given of the operation in cases where the reception field strength is displayed on the display unit 118.

As described above, on the basis of the result of detection of the voltage level of the power supply route 130a, the voltage detection circuit 130 determines whether or not the portable radio device 100 is installed on the vehicle-mounted main body 200, and this information is supplied to the CPU 161.

Then, upon determining that the portable radio device 100 is not installed on the vehicle-mounted main body, the voltage detection circuit 130 changes over the changeover switch 102 to the antenna 101 side. Accordingly, in this case, the reception signal is introduced via the antenna 101, and this reception signal is sent from the antenna 101 to the radio unit 103 via the changeover switch 102 (see FIG. 1). In the radio unit 103, the reception signal is sent from the duplexer 13 to the demodulator 131 (see FIG. 2). In the demodulator 131, the signal is sent from the mixer 131a to the intermediate frequency circuit 131g via the intermediate frequency amplifier 131c, the mixer 131d, and the intermediate frequency amplifier 131f (see FIG. 3). At this stage in the intermediate frequency circuit 131g, an output of each linear amplifier 131h is detected via the diode 131h, and the detected signal is sent to the CPU 161 via the A/D converter 131j as the signal representative of the reception field strength.

On the other hand, upon determining that the portable radio device 100 is installed on the vehicle-mounted main body, the voltage detection circuit 130 changes over the changeover switch 102 to the vehicle-mounted main body side. Accordingly, in this case, the reception signal is introduced via the antenna 201, and this reception signal is sent from the antenna 201 to the radio unit 103 via the booster 202, the connector unit 205, and the changeover switch 102 (see FIG. 1). Subsequently, after going through the respective parts in the same way as described above, the signal representative of the reception field strength is sent to the CPU 161.

As described above, the CPU 161 is informed by the voltage detection circuit 130 of the fact that the portable radio device 100 is installed on the vehicle-mounted main body.

When the portable radio device 100 is installed on the vehicle-mounted main body, the CPU 161 conducts correction of the signal representative of the reception field strength. On the basis of the corrected signal concerning the reception field strength, the CPU 161 controls the display/operation control unit 120 of the operation/control section 112 and drives the LED driver 118a of the display unit 118, thereby allowing the liquid crystal display 118b to display the reception field strength.

The aforementioned correction is carried out as follows. The reception field strength is classified into five levels, as shown in FIG. 7. The first level is not less than −70 dBm; the second level is less than −70 dBm and not less than −80 dBm; the third level is less than −80 dBm and not less than −90 dBm; the fourth level is less than −90 dBm and not less than −100 dBm; and the fifth level is less than −100 dBm (note than 0 dBm: 1 mW/50Ω). Digital outputs of the A/D converter 131j corresponding to these threshold values .−70 dBm, −80 dBm, −90 dBm, and −100 dBm are stored in the E$^2$PROM 107. The storage of digital values corresponding to these threshold values in the E$^2$PROM 107 is effected as described below.

In the manufacturing process of this apparatus in the initial stage, the portable radio device 100 is set as a separate unit, a predetermined transmitter 300 is disposed in the vicinity of the antenna 101, and radio signals with outputs of −70 dBm, −80 dBm, −90 dBm, and −100 dBm are transmitted from the transmitter 300.

The portable radio device 100 stores the outputs of the A/D converter 131j, e.g., 80, 70, 60, and 50, in the E$^2$PROM 107 via the CPU 161 as threshold values corresponding to the respective radio signals.

Figure 8:
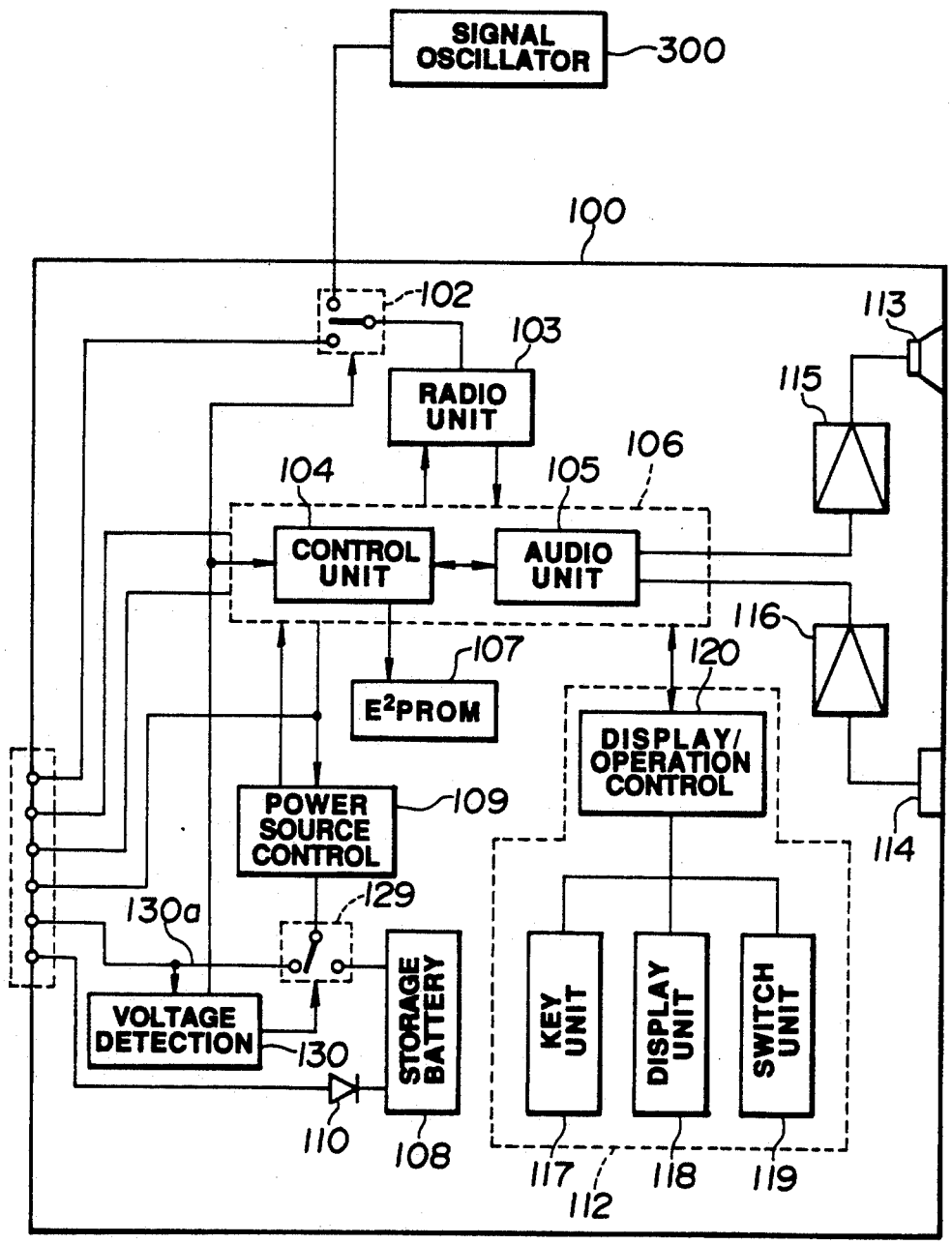
FIG. 8 is a diagram illustrating the operating of setting a threshold value for determining the reception field strength in cases where a portable radio device is used singly.

Specifically, as shown in FIG. 8, the portable radio device 100 is fist set as a separate unit, and instead of the antenna 101 the signal oscillator 300 for oscillating a predetermined signal with a known intensity (antenna input field level) is connected to the portable radio device 100. The automatic portable radio device 100 is set to a threshold value setting mode through a predetermined operation of the key unit 117 by pressing, for example, buttons "FNC", "#", and "0".

Here, it is assumed that a setting is provided such that when the antenna input field level has exceeded A dB, the number of the segments being lit for displaying the field strength signal on the liquid crystal display 118b becomes "1" (level 4).

Figure 10:
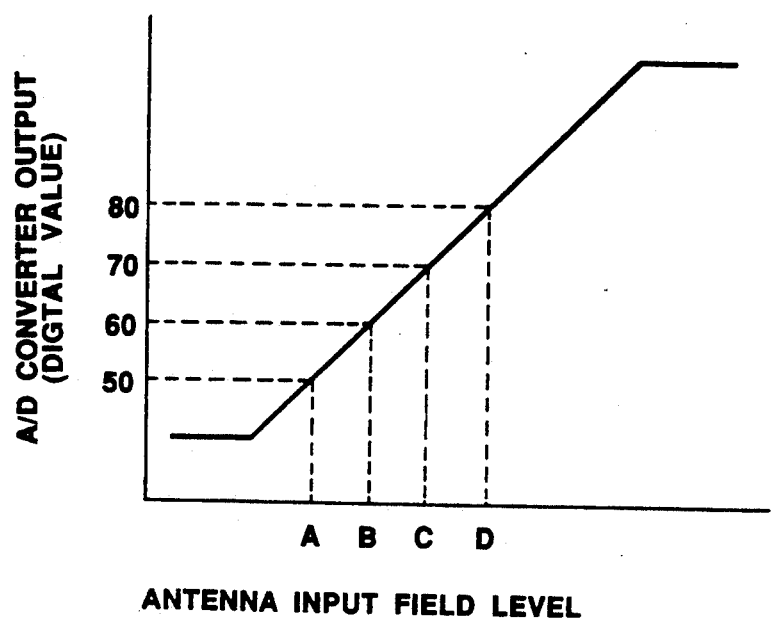
FIG. 10 is a diagram illustrating a threshold value for determining the reception field strength.

In this case, a predetermined signal with an antenna input field level of A dB is inputted from the signal oscillator 300. At this juncture, if it is assumed that the digital value outputted from the A/D converter 132j is "50" as shown in FIG. 10, this value "50" is stored in the E²PROM 107 as the threshold value corresponding to the level 4 by a predetermined operation on the key unit 117, e.g., by pressing buttons "#" and "1".

Then, it is assumed that a setting is provided such that when the antenna input field level has exceeded B dB, the number of the segments being lit for displaying the field strength signal in the liquid crystal display 118b becomes "2" (level 3).

In this case, a predetermined signal with an antennal input field level of B dB is inputted from the signal oscillator 300. At this juncture, if it is assumed that the digital value outputted from the A/D converter 132j is "60" as shown in FIG. 10, this value "60" is stored in the E²PROM 107 as the threshold value corresponding to the level 3 by a predetermined operation of the key unit 117, e.g., by pressing buttons "#" and "2".

Thereafter, threshold values corresponding to the level 2, in which the number of the segments being lit for displaying the field strength signal on the liquid crystal display 118b is "3", as well as to the level 1, in which the number of the segments being lit for displaying the field strength signal on the liquid crystal display 118b is "4", are respectively stored in the E²PROM 107 in a similar manner.

Figure 9:
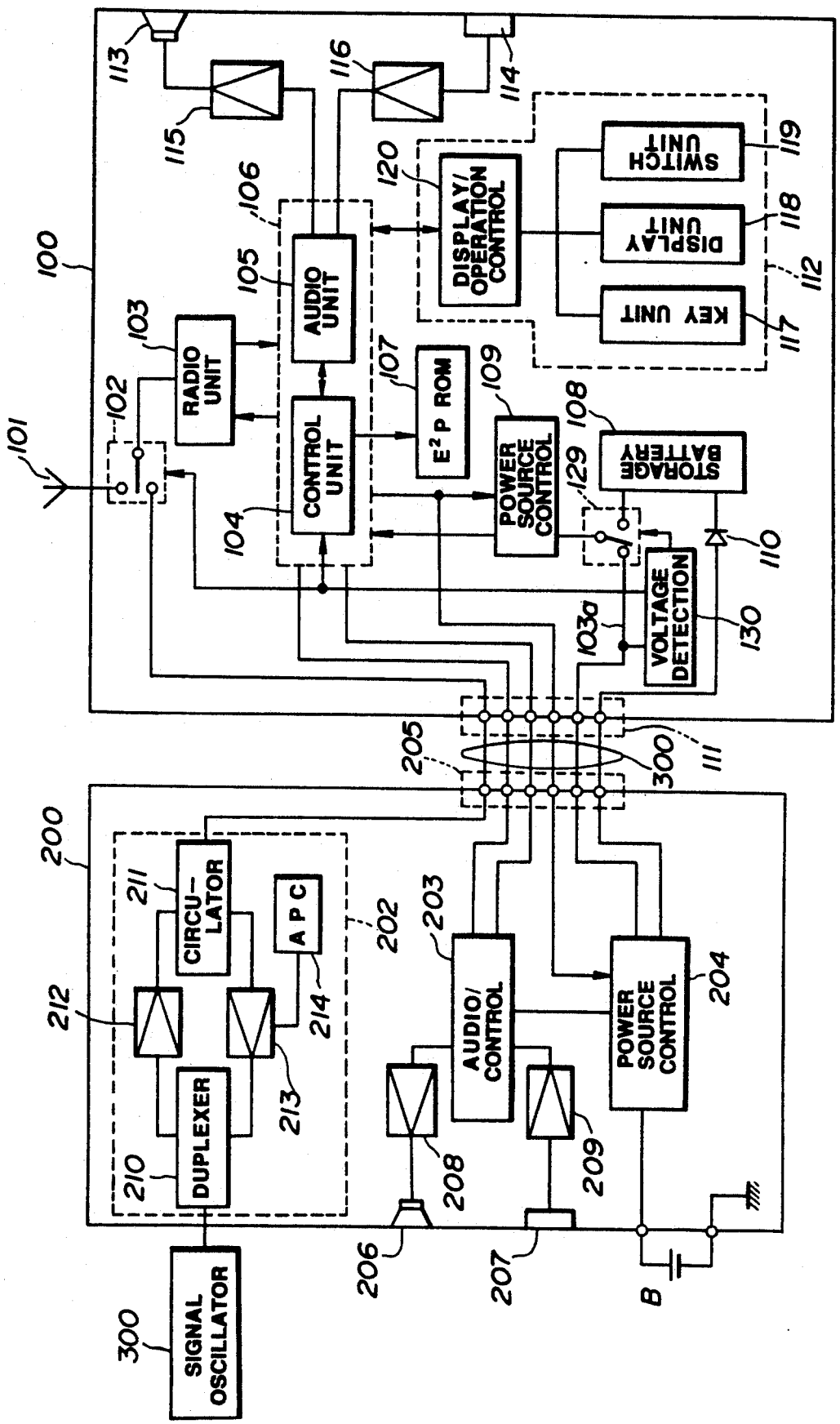
FIG. 9 is a diagram illustrating the operation of setting a threshold value for determining the reception field strength in cases where the portable radio device is connected to a vehicle-mounted main body.

Then, in a state in which the portable radio device 100 is connected to the vehicle-mounted main body, as shown in FIG. 9, the predetermined transmitter 300 is similarly placed instead of the antenna 201, and radio signals with outputs of −70 dBm, −80 dBm, −90 dBm, and −100 dBm are transmitted to the transmitter 300. Outputs of the A/D converter 131j at this time, e.g., 85, 74, 66, and 54, are inputted to the CPU 161. The CPU 161 stores these values in the E²PROM 107. Thus, detected values at the time when the two units are connected to each other are stored in the E²PROM 107 as correction values.

During normal operation, correction is carried out as follows: The CPU 161 monitors the state of connection between the portable radio device 100 and the vehicle-mounted main body in short periods. If the portable radio device 100 is being used as a separate unit, the CPU 161 makes a comparison between the output (reception field strength) of the A/D converter 131j with the threshold values 80, 70, 60, and 50 stored in the E²PROM 107, determines the level under which the reception field strength falls among the first to fifth levels, and then displays the result on the liquid crystal display 118b of the display unit 118.

Figure 11:
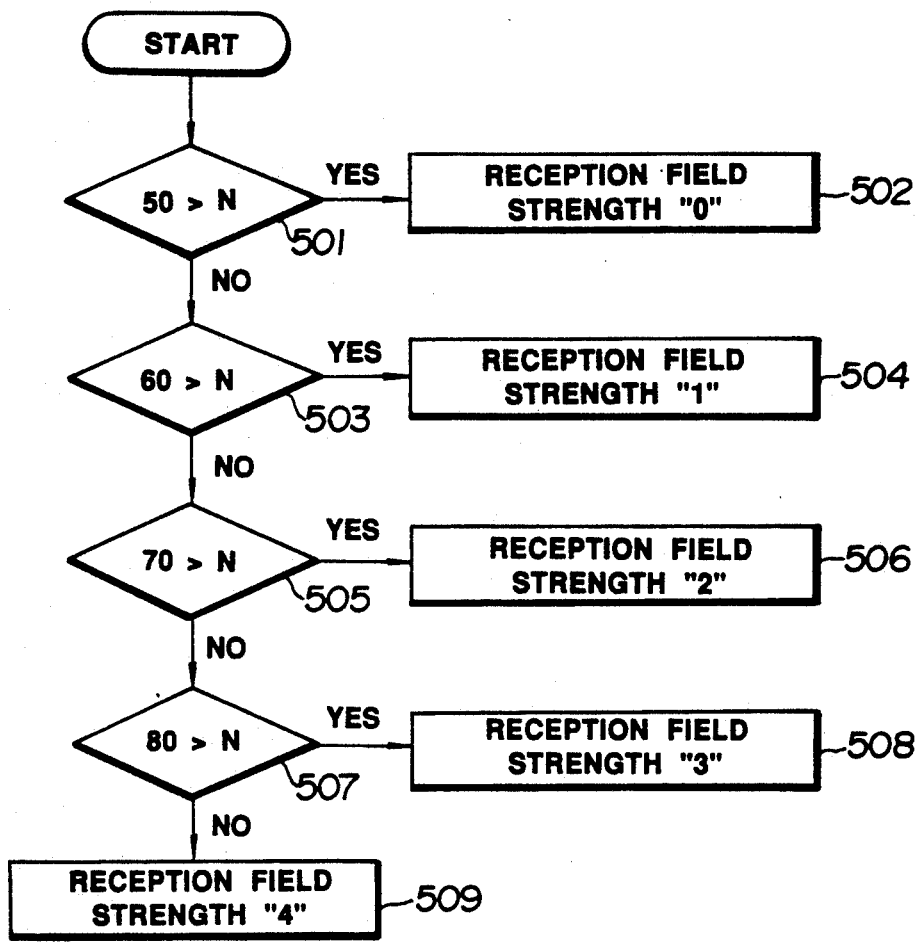
FIG. 11 is a flowchart illustrating the operation of displaying the reception field strength.

Namely, as shown in the flowchart shown in FIG. 11, the CPU 161 first makes a comparison between digital data N outputted from the A/D converter 131j and the threshold value "50" stored in the E²PROM 107 (Step 501). If the digital data N is smaller than the threshold value "50", the CPU 161 issues a command so that a display "0" will be given on the liquid crystal display 118b as the minimum level 5 in terms of the reception field strength, i.e., the number of the segments to be lit in displaying the reception field strength will be set to "0" (Step 502).

If the digital data N is greater than the threshold value "50", the CPU 161 makes a comparison between the digital data N and the threshold value "60" (Step 503). If the digital data N is smaller than the threshold value "60", it is assumed that the level is 4, and the CPU 161 therefore issues a command so that a display "1"will be given on the liquid crystal display 118b as the level 4 in terms of the reception field strength, i.e., the number of the segments to be lit in displaying the reception field strength will be set to "1" (Step 504).

If the digital data N is greater than the threshold value "60", the CPU 161 makes a comparison between the digital data N and the threshold value "70" (Step 505). If the digital data N is smaller than the threshold value "70", it is assumed that the level is 3, and the CPU 161 therefore issues a command so that a display "2" will be given on the liquid crystal display 118b as the level 3 in terms of the reception field strength, i.e., the number of the segments to be lit in displaying the reception field strength will be set to "2" (Step 506).

If the digital data N is greater than the threshold value "70", the CPU 161 makes a comparison between the digital data N and the threshold value "80" (Step 507). If the digital data N is smaller than the threshold value "80", it is assumed that the level is 2, and the CPU 161 therefore issues a command so that a display "3" will be given on the liquid crystal display 118b as the level 2 in terms of the reception field strength, i.e., the number of the segments to be lit in displaying the reception field strength will be set to "3" (Step 508).

If the digital data N is greater than the threshold value "80", it is assumed that the level is the maximum level 1, and the CPU 161 therefore issues a command so that a display "4" will be given on the liquid crystal display 118b in terms of the reception field strength, i.e., the number of the segments to be lit in displaying the reception field strength will be set to "4" (Step 509).

Meanwhile, if it is detected that the portable radio device 100 is connected to the vehicle-mounted main body, the CPU 161 makes a comparison between the output (reception field strength) of the A/D converter 131j with the threshold values 85, 74, 66, 54 stored in the ROM, determines the level under which the reception field strength falls among the first to fifth levels, and then displays the result on the display unit 118. The displaying operation in this case is similar to the operation described above in detail concerning the case in which the portable radio device 100 is a single unit.

Thus, correction data are stored in advance in the E²PROM 107, the correction data being such that the level of the reception field strength detected by the route of the antenna 101 and the level of the reception field strength detected by the route of the antenna 201 become identical when the reception signals have the same reception field strength. The CPU 161 determines the level of the reception field strength on the basis of the correction data.

In this manner, with the radio telephone apparatus in accordance with the present invention, the reception field strength can always be displayed accurately by the display unit 118.

In addition, in this case, the reception field strength can be displayed accurately without being affected by such as variations in the performance between between various apparatus.

It should be noted that the above-described correction may be effected with respect to signals representative of the reception field strength flowing through either one or both of the routes.

In addition, as indicated by a broken line in FIG. 2, an arrangement may be provided such that by providing a temperature detecting sensor 180, a signal representative of the reception field strength is corrected in response to the ambient temperature, and the display of the reception field strength is given by the display unit 118 on the basis of the corrected signal representative of the reception field strength. In this case, even if the characteristics of various parts vary owing to temperature fluctuations, the reception field strength can always be displayed accurately by the display unit 118.

Furthermore, an arrangement may be alternatively provided such that a signal representative of the reception field strength is corrected in correspondence with a channel in use, i.e., a frequency in use which is controlled by the synthesizer 135 shown in FIG. 2, and the display of the reception field strength is given by the display unit 118 on the basis of the corrected signal representative of the reception field strength. In this case, even if the intensity of the reception field strength varies owing to characteristics of such as a filter, the reception field strength can always be displayed accurately on the display unit 118.

It should be noted that the present invention is not restricted to the above-described embodiment.

For instance, although in the embodiment the storage of threshold values is effected by the E2PROM, the storage may be effected by a RAM of a battery backup type.

In addition, although at the time of setting threshold values the signal oscillator 300 is directly connected instead of the antenna 101 or 201, an arrangement may be alternatively provided such that the signal of the signal oscillator 300 is inputted from the antenna 101 or 201 via a radio communication channel. In this case, the setting of threshold values can be conducted collectively for a plurality of apparatus, and trouble entailed in connection can be dispensed with.

Furthermore, although in the above-described embodiment the threshold values are set in the manufacturing process, the threshold values may be set by the users. that is, the threshold values are inputted through a predetermined operation of the key unit 117. As a result, the users are capable of having the reception field strength displayed in accordance with their preferences. An example of operation thereof will be given below. First, the portable radio device 100 is set to a threshold value changing mode through a predetermined operation of the key unit 117, e.g., by pressing buttons "FNC", "*", and "0". Then, when a change is to be made, for example, from "50" to "52" as a threshold value corresponding to a lighting level "1", a predetermined operation is effected on the key unit 117 by pressing the buttons "*", "1", "*", "5", and "2".

What is claimed is:

1. A radio communication apparatus including a vehicle-mounted main body which is mounted in a vehicle and a portable radio device which performs the function of an automobile telephone by being installed on said vehicle-mounted main body and also performs the function of an independent radio telephone by being removed therefrom, said radio communication apparatus comprising:

installation determining means for determining whether or not said portable radio device is installed on said vehicle-mounted main body;

first detecting means for detecting a reception field strength of a reception signal received by said vehicle-mounted main body when it is determined by said installation determining means that said portable radio device is installed on said vehicle-mounted main body;

second detecting means for detecting a reception field strength of a reception signal received by said portable radio device when it is determined by said installation determining means that said portable radio device is not installed on said vehicle-mounted main body;

storage means for storing predetermined data for setting to identical values the reception field strength detected by said first detecting means and the reception field strength detected by said second detecting means when the reception signals received by said vehicle-mounted main body and said portable radio device have the same reception field strength;

correcting means for correcting the reception field strength detected by said first detecting means and/or the reception field strength detected by said second detecting means, on the basis of the predetermined data stored in said storage means; and display means for displaying the reception field strength corrected by said correcting means.

2. A radio communication apparatus comprising:

receiving means for receiving a radio signal received through a radio communication channel;

detecting means for detecting a reception field strength of the radio signal received by said receiving means;

storage means for storing a plurality of threshold values set in accordance with levels of reception field strength;

comparing means for determining the level of the reception field strength detected by said detection means, through a comparison with the threshold values stored in said storing means;

display means for displaying the level of the reception field strength determined by said comparing means;

writing means for writing in said storage means a value based on the reception field strength detected by said detecting means; and means for inputting a predetermined signal with a known reception field strength to said radio communication apparatus through said receiving means, and for rewriting the threshold values stored in said storage means by a value based on a reception field strength of said predetermined signal detected by said detection means.

3. A radio communication apparatus comprising:

a vehicle-mounted main body having a first antenna and being mounted in a vehicle;

a portable radio device having a second antenna and being detachably connected to said vehicle-mounted main body, which performs, in a first mode where said portable radio device is connected to said vehicle-mounted main body, the function of an automobile radio telephone through said first antenna and said vehicle-mounted main body and, in a second mode where said portable radio device is detached from said vehicle-mounted main body, performs the function of an independent radio telephone through said second antenna independently from said vehicle-mounted main body;

reception field strength detecting means, provided in said portable radio device, for detecting a reception field strength of a reception signal received through said first antenna and said vehicle-mounted main body in said first mode, and for detecting a reception field strength of a reception signal received through said second antenna in said second mode;

connection detecting means for detecting whether said radio communication apparatus is being used in said first mode or in said second mode;

reception field strength correcting means for correcting an output of said reception field strength detecting means in response to a detection output of said connection detecting means; and display means for displaying the reception field strength corrected by said reception field strength correcting means.

4. The radio communication apparatus according to claim 3, wherein said reception field strength correcting means includes:

storage means for storing different correction data in correspondence with said first mode and said second mode; and corrected field strength data generating means for correcting the reception field strength detected from the reception signal in accordance with the correction data stored in said storage means to generate corrected field strength data.

5. The radio communication apparatus according to claim 4, wherein said storage means stores a plurality of threshold values corresponding to reception field strengths, said corrected field strength data generating means generates data of incremental levels by comparing said plurality of threshold values stored in said storage means and the reception field strength detected by said reception field strength detecting means, and wherein said display means incrementally displays the reception field strength on the basis of the data of the incremental levels generated by said corrected field strength data generating means.

6. The radio communication apparatus according to claim 3, further comprising temperature detecting means for detecting an ambient temperature of said radio communication apparatus, wherein said reception field strength correcting means corrects the output of said reception field strength detecting means in accordance with the detection output of said connection detecting means and in accordance with the detection output of said temperature detecting means.

7. The radio communication apparatus according to claim 3, wherein said reception field strength correcting means corrects the output of said reception field strength detecting means in accordance with the detection output of said connection detecting means and in accordance with a frequency of a radio communication channel used in said portable radio device.

8. A radio communication apparatus comprising:

a vehicle-mounted main body having a first antenna and being mounted in a vehicle;

a portable radio device having a second antenna and being detachably connected to said vehicle-mounted main body, which performs, in a first mode where said portable radio device is connected to said vehicle-mounted main body, the function of an automobile radio telephone through said first antenna and said vehicle-mounted main body and, in a second mode where said portable radio device is detached from said vehicle-mounted main body, performs the function of an independent radio telephone through said second antenna independently from said vehicle-mounted main body;

reception field strength detecting means, provided in said portable radio device, for detecting a reception field strength of a reception signal received through said first antenna and said vehicle-mounted main body in said first mode, and for detecting a reception field strength of a reception signal received through said second antenna in said second mode;

first storage means for storing detection outputs of said reception field strength detecting means as a plurality of threshold values when in said first mode, said detection outputs being obtained when a signal having incrementally-changing field strength is applied from a signal source having a known field strength to said first antenna;

second storing means for storing detection outputs of said reception field strength detecting means as a plurality of threshold values when in said second mode, said detection outputs being obtained when said signal having the incrementally-changing field strengths is applied from said signal source having said known field strength to said second antenna;

connection detecting means for detecting whether said radio communication apparatus is being used in said first mode or in said second mode;

data generating means for generating, when said first mode is detected by said connection detecting means, data of incremental levels by comparing said plurality of threshold values stored in said first storage means and the reception field strength detected by said reception field strength detecting means and, when said second mode is detected by said connection detecting means, data of incremental levels by comparing said plurality of threshold values stored in said second storage means and the reception field strength detected by said reception field strength detecting means, respectively; and display means for icrementally displaying the reception field strength by the data of the incremental levels generated by said data generating means.

9. The radio communication apparatus according to claim 8, wherein said first and second storage means comprise $E^2$ PROM.

10. A method of setting a threshold value for displaying a reception field strength of a reception signal received by a radio communication apparatus which includes:

a vehicle-mounted main body having a first antenna and being mounted in a vehicle;

a portable radio device having a second antenna and being detachably connected to said vehicle-mounted main body, which performs, in a first mode where said portable radio device is connected to said vehicle-mounted main body, the function of an automobile radio telephone through said first antenna and said vehicle-mounted main body and, in a second mode where said portable radio device is detached from said vehicle-mounted main body, performs the function of an independent radio telephone through said second antenna independently from said vehicle-mounted main body;

reception field strength detecting means, provided in said portable radio device, for detecting a reception field strength of a reception signal received through said first antenna and said vehicle-mounted main body in said first mode, and for detecting a reception field strength of a reception signal received through said second antenna in said second mode;

storage means for storing a plurality of first threshold values and a plurality of second threshold values in corresponding with said first and second modes, respectively;

connection detecting means for detecting whether said radio communication apparatus is being used in said first mode or in said second mode;

data generating means for generating, when said first mode is detected by said connection detecting means, data of incremental levels by comparing said plurality of the first threshold values and the reception field strength detected by said reception field strength detecting means and, when said second mode is detected by said connection detecting means data of incremental levels by comparing said plurality of the second threshold values and the reception field strength detected by said reception field strength-detecting means, respectively; and display means for incrementally displaying the reception field strength by the data of the incremental levels generated by said data generating means, said method comprising the steps of:

applying, in said first mode, a signal having incrementally-changing field strength from a signal source having a known field strength to said first antenna and writing detecting outputs of said reception field strength detecting means as said plurality of the first threshold values into said storage means; and applying, in said second mode, said signal having the incrementally-changing field strengths from said signal source having said known field strength to said second antenna and writing detection outputs of said reception field strength-detecting means as the plurality of said second threshold values into said storage means.

* * * * *